United States Statutory Invention Registration [19]

[11] Reg. Number: H277

Lee et al. [43] Published: May 5, 1987

[54] OPTICAL POSITION GAUGE

[75] Inventors: Steven Lee, Kensington; Paul Smith, Silver Spring; Patrick Davis, College Park, all of Md.

[73] Assignee: The United States of America as represented by the Secretary of the Navy, Washington, D.C.

[21] Appl. No.: 925,039

[22] Filed: Oct. 30, 1986

[51] Int. Cl.[4] ..... G01D 5/34

[52] U.S. Cl. ..... 250/231 R; 250/237 G

*Primary Examiner*—Stephen C. Buczinski
*Assistant Examiner*—Linda J. Wallace
*Attorney, Agent, or Firm*—Kenneth E. Walden

[57] ABSTRACT

Apparatus for measuring the direction, extent and rate of linear displacement of a body (e.g. a steel bulkhead) subjected to a harsh environment such as shock from an explosive force. A housing containing an extendable piston is connected between the movable body and a fixed structure. The piston has a surface marked with alternating high and low light reflecting bands which pass under a pair of light emitting optical fibers fixed on the housing. Light reflected from the bands is detected and converted into corresponding out of phase electrical signals for measuring direction, extent and rate of linear displacement of the piston.

15 Claims, 9 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISPLACEMENT = N × D
WHERE D = SEPARATION BETWEEN RINGS
N = NUMBER OF PULSES MEASURED

OPTICAL POSITION GAUGE

BACKGROUND OF THE INVENTION

This invention is concerned with an instrument for measuring displacement of a body or object in a harsh environment such as is present in the vicinity of an underwater explosion. Instruments for measuring displacements due to explosive forces are, in the process often destroyed or rendered ineffective themselves.

There are three basic methods of measuring displacement: (1) mechanical, (e.g., deformable material, such as lead cones); (2) acoustic timing (e.g., transmit and receive); and, (3) accelerometers. Lead cones have limitations in their use in measuring single axis deflections. The lead cone is placed between a body or object to be moved and a rigid (fixed) structure. The cone collapses upon movement of the body or object toward the rigid structure. The disadvantage of the lead cone is that it measures only maximum displacement in one direction and cannot be re-used, and is subject to shock damage. Acoustic devices are basically pressure measuring devices. Shock waves may "blind" receivers during critical measuring times. Thus, acoustic devices are not ideal in explosive environments. Accelerometers deliver a signal proportional to the acceleration of the moving body (object). To determine single axis (linear) displacement requires double integration of the data with respect to time. During this double integration, errors tend to add and not average out. Small accelerations and timing errors lead to inaccurate displacement measurements.

In the setting where the present invention will be used, it will be desired to measure the direction, extent and rate of linear displacement of a body relative to a rigid (fixed) structure, for example. It is desirable to obtain these data in an explosive environment without experiencing destruction or malfunction of test equipment.

SUMMARY OF THE INVENTION

There is disclosed herein an instrument for measuring movement of a body relative to a fixed position. It includes a housing containing an extendable and retractable piston which extends from the housing. The housing is adapted to be connected to a fixed structure, and the outer end of the piston is adapted to be connected to the body which is to be subjected to movement by an explosive force. Upon movement of the body due to the explosion, the piston is caused to move inside the housing. The piston includes a surface provided with side by side bands of alternating high and low light reflectivity. Light sources positioned inside the housing and terminating in a pair of linearly spaced apart optical fiber ends which illuminates two small linearly spaced apart spots on the piston surface. As the piston moves in the housing, its bands pass underneath the light spots and relative reflectivity is detected and converted into electrical signals having similar characteristics. The signal is read out to provide information as to direction, extent and rate of linear piston displacement, thus, providing the desired information regarding movement of the body which has been subjected to the explosive shock.

It is, therefore, an object of the invention to provide an arrangement embodied in an instrument for measuring direction, extent, and rate of linear displacement of an object subjected to a shock such as from an explosion in water.

It is another object of the invention to provide an instrument connectable between a fixed structure and a body to be subjected to explosive shock including means generating optical signals convertable to electrical signals having similar characteristics for indicating displacement characteristics on the body.

Still other objects of the invention will become apparent to one upon reading the specifiction in conjunction with drawings which form a part thereof.

DETAILED DESCRIPTION OF THE INVENTION

Figure 1:
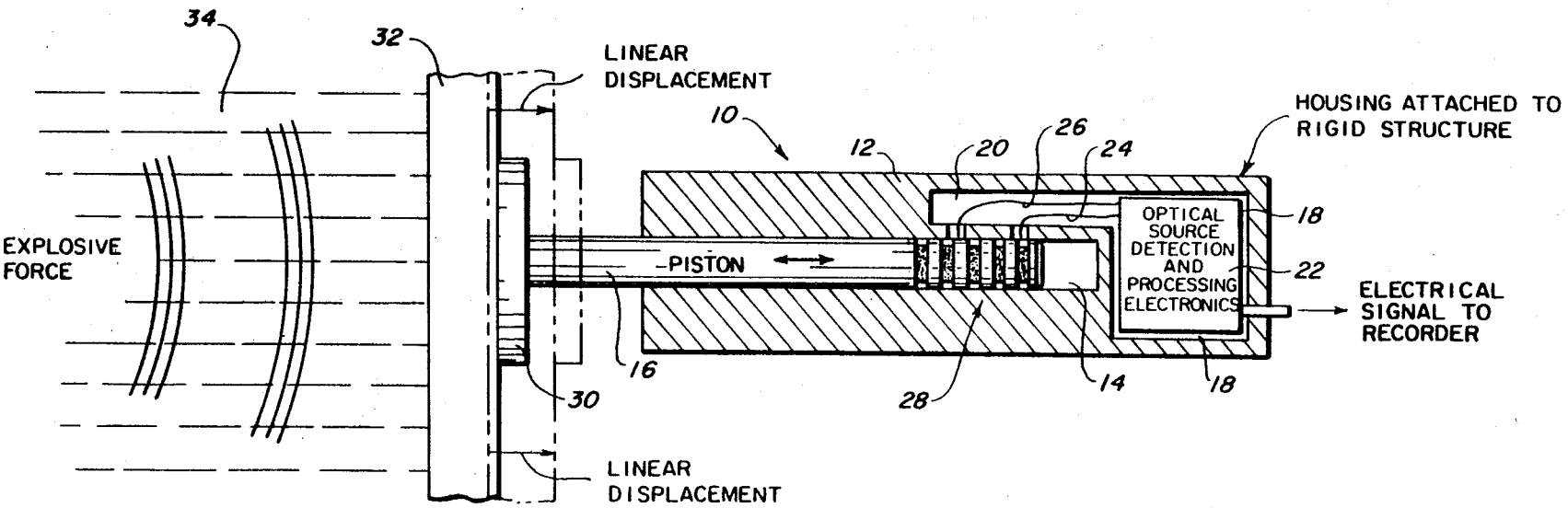
FIG. 1 is a cross-sectional view of the apparatus according to the invention illustrated in association with a body subjected to an explosive force.

For a detailed understanding of the invention, refer first to FIG. 1 where there is shown in cross section a device, identified generally by the numeral 10, comprising housing 12 provided with a cylindrical opening 14 in which piston 16 is positioned for linear displacement. Housing 12 is also provided with a cavity 18 including an extended portion 20 having small openings for allowing optical fiber communication with cylindrical opening 14. Cavity 18 is adapted to receive optical and electronic processing equipment represented by block 22, the workings of which will be described in detail later in the specification. Optical fibers 24 and 26 extend from inside block 22, through cavity portion 20, and terminate in fixed positions in housing 12 in optical communication with banded surface 28 on piston 16. Operating details of device 10 will be fully described after further introductory coverage.

Figure 2:
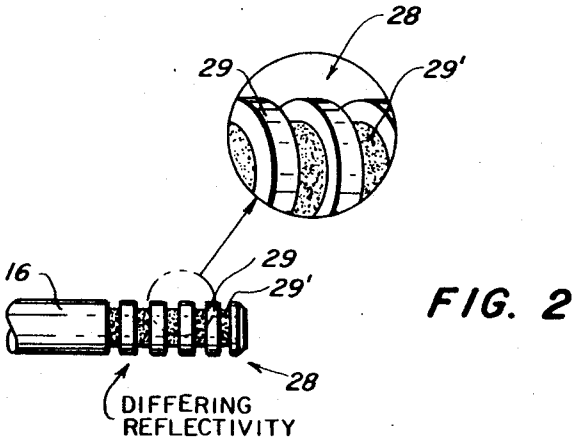
FIG. 2 is a detailed illustration of lands and grooves to define reflective bands on the piston.

Housing 12 is adapted to be connected to some rigid or fixed structure (not illustrated), while the outer end of piston 16 terminating in head 30 is adapted to be secured to body or object 32, such as a steel plate, interfacing with water 34. It is through this water that explosive forces are transmitted against the plate. Explosive displacement of plate 32 to the right, as viewed in FIG. 1, moves piston 16 to the right. This causes banded portion 28 of the piston to translate past the light emitting ends of spaced apart optical fibers 24 and 26. As illustrated in FIG. 2, banded end 28 of piston 16 is comprised of a plurality of annular lands 29 and grooves 29'. The purpose of these bands is to present surfaces having alternating high and low light reflectivity. One method of forming bands of different reflectivity is to machine spaced apart annular grooves 29' around piston 16 and leave them separated by lands 29. The land surfaces may be polished for high light reflectivity while the grooves are left as machined with little or no finishing for low light reflectivity. The bands may also be formed by numerous types of surface treatment for obtaining different reflectivity. Furthermore, the bands, regardless of form, need not be annular about the piston. They can be in side by side bar relationship. Regardless of form, the bands or bars are preferably of the same linear widths, but this is not a critical requirement.

Figure 3:
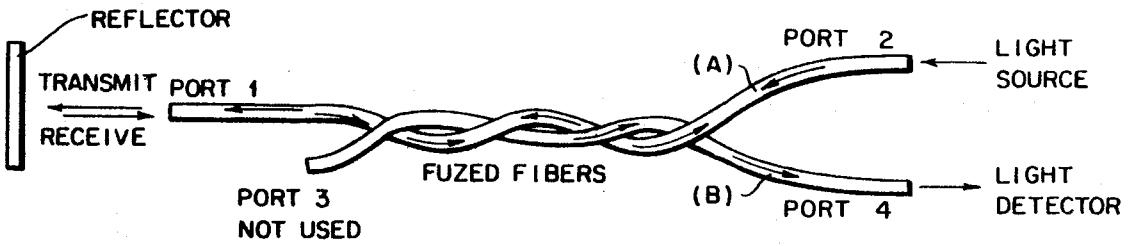
FIG. 3 is an illustration of optical fibers in light coupling relationship.

FIG. 3 is included in the drawing for illustrating a principle of optical coupling from one fiber to another. When portions of optical fibers have their cladding removed and are fused together light will leak from one fiber (A) to another fiber (B), or vice versa. These fibers may be either twisted or otherwise retained in close adjacency. Another principle for coupling light between fibers is taught in U.S. Pat. No. 4,264,126, issued to Sang K. Sheem, where the cladding in the area of light transfer is first etched away to allow light leakage. The fibers are subsequently encased in a liquid or other substance having an appropriately lower index of refraction to prevent significant light leakage.

Figure 4:
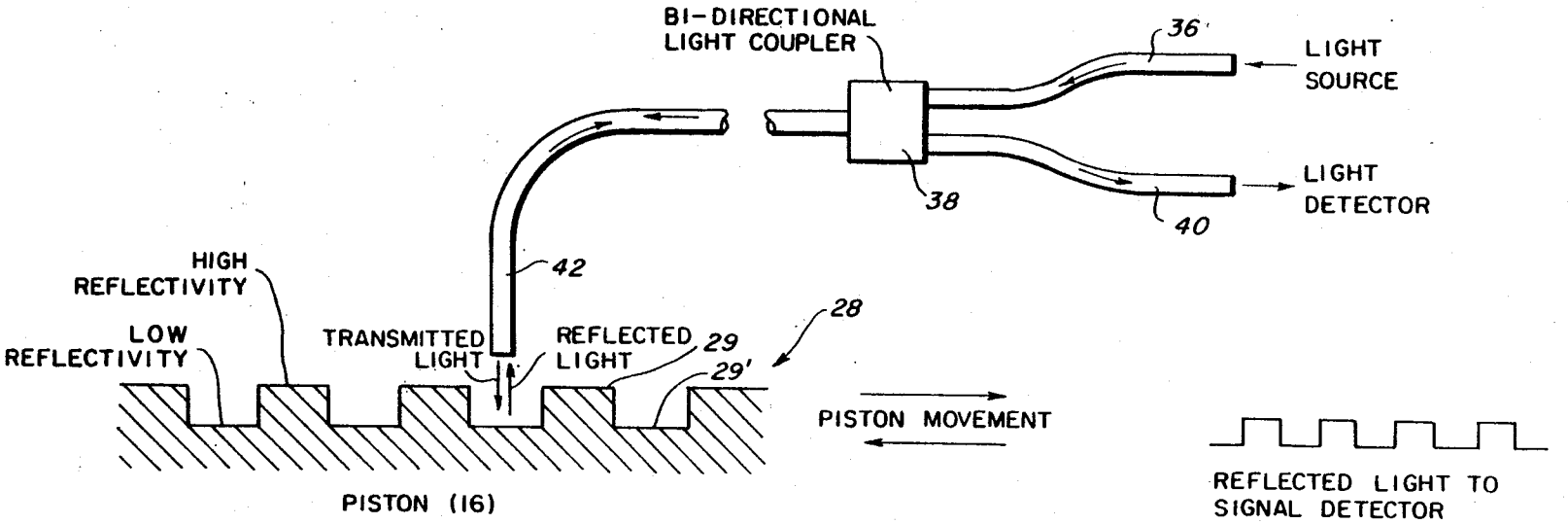
FIG. 4 illustrates a principle of the invention.

A light emitting diode (LED) may be used as a light source (not illustrated) for introducing light into the end of optical fiber (A) at port 2. This light passes along the fiber, and, upon exiting from port 1, strikes a reflector to be returned to Fiber (A) where it travels back in the reverse direction. Some of the light splits or divides into fiber (B) and exits port 4 into photodiode detector (not illustrated). This principle of light coupling is followed in FIG. 4. In FIG. 4, light introduced into the end of optical fiber 36 passes to optical coupler 38 and exits the optical fiber at end 42. The light is reflected by the surface of groove 29' of piston 16 back into the fiber where it travels in the reverse direction to coupler 38. There the light divides, and part of it is leaked into fiber 40 from which it exits to a light detector (not illustrated). The magnitude of light returned (reflected) into fiber 42 and coupled into optical fiber 40 depends upon the reflectivity of groove 29'. Upon linear movement of piston 16, alternating magnitudes of light reflected from surface 29' (low reflectivity) and surface 29 (high reflectivity) produce a square signal, such as illustrated in FIG. 4. This is produced and fed to a detector. This signal can then be converted into an electrical signal by the processes disclosed in FIGS. 6 and 7. One electric output signal alone, while representing displacement and rate of displacement of piston 16, would fail to indicate the direction of displacement. By using a dual optical arrangement as illustrated in FIG. 5, the direction of piston 16 can also be derived.

Figure 5:
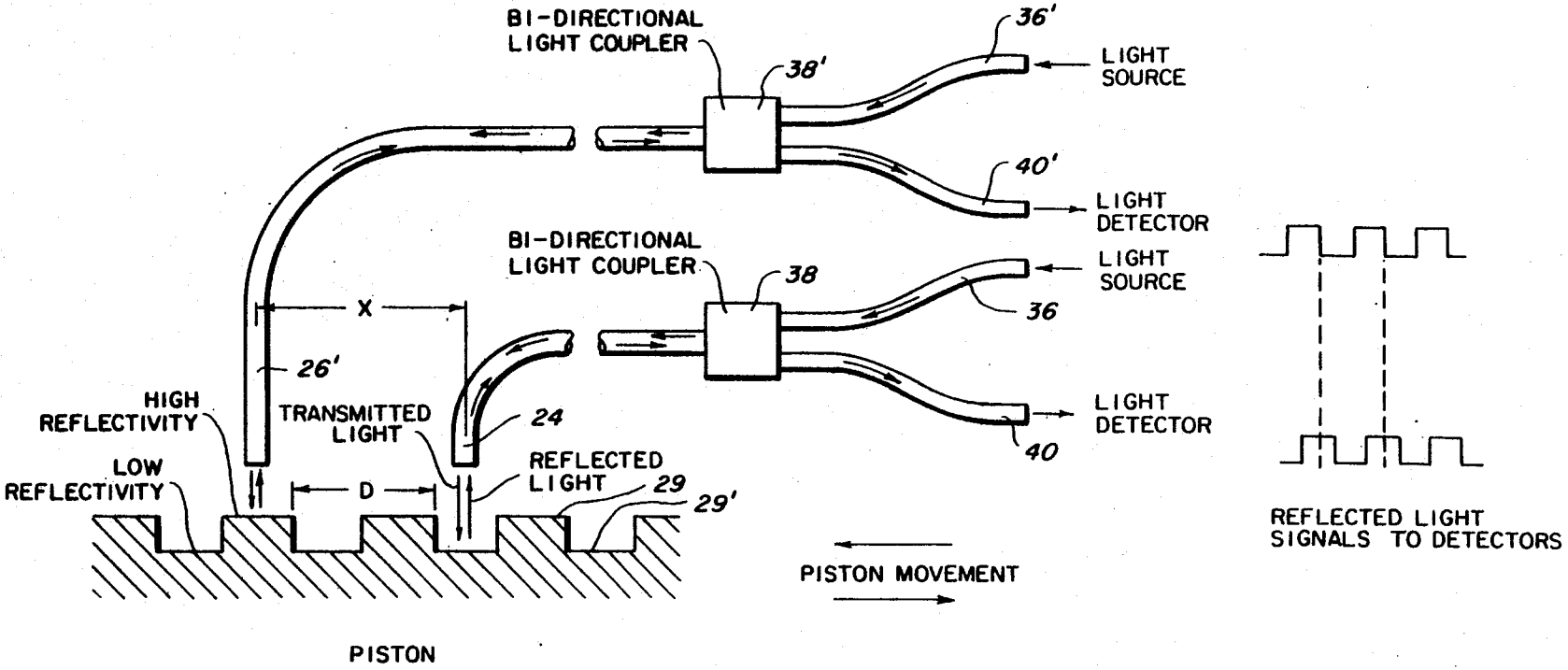
FIG. 5 is similar to the illustration in FIG. 4 but includes an additional optical arrangement.
Figure 9:
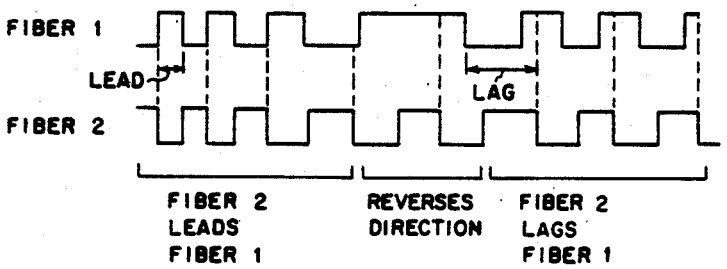
FIG. 9 illustrates recorded read out of piston movement in both linear directions.

In the FIG. 5 embodiment, light is also launched into optical fiber 36' from another LED (not illustrated). This light passed through coupler 38' and along the optical fiber to exit at end 26'. Upon striking the surface of land 29, it reflects back into the fiber, through coupler 38', where a portion is split into optical fiber 40' and fed to another photodetector (not illustrated). The optical signal which exits optical fiber 40' is processed in the same manner as described with reference to FIG. 4. The embodiment of FIG. 4 is included in FIG. 5. It will be noted that the square signals emanating from optical fibers 40 and 40' are slightly out of phase. This allows the direction of travel of piston 16 to be derived. The out of phase outputs are accomplished by placing the light output ends of optical fibers 24 and 26' at non-half-integer spacings opposite bands 28 such that a phase shift occurs between the two fiber outputs. The distance X is not equal to ½ N D, where D equals the ring separation and N equals integer. This provides the information needed to determine direction that piston 16 is traveling. When a translation from leading to lagging occurs between the two fiber outputs, a change in direction of travel of piston 16 is indicated, as shown in FIG. 9.

Figure 6:
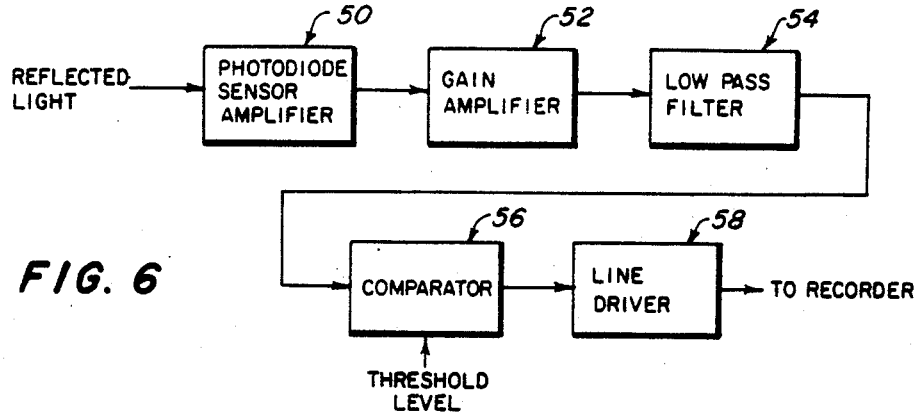
FIG. 6 is a block diagram illustration of electronic processing of reflected light.
Figure 7:
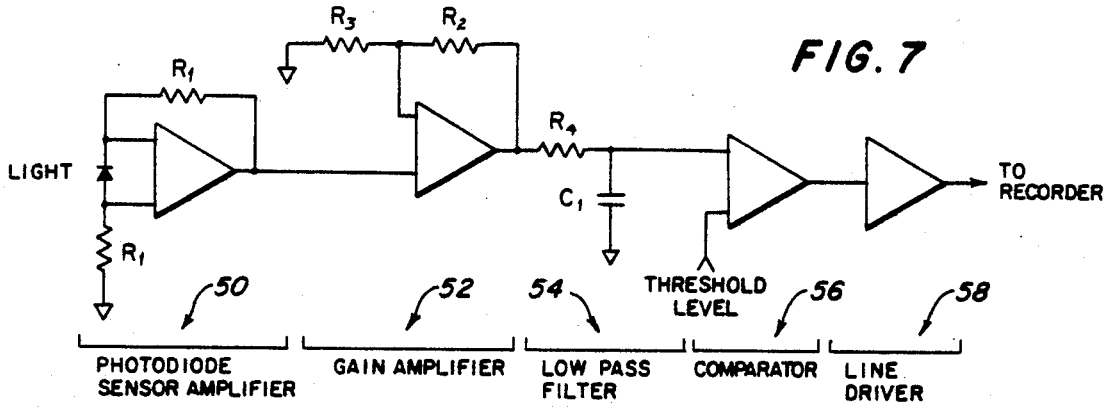
FIG. 7 is a schematic illustration of the electrical processing of reflected light.
Figure 8:
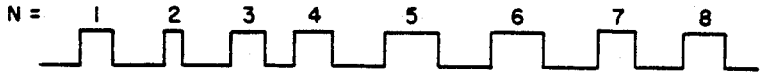
FIG. 8 illustrates piston displacement.

Referring now to FIGS. 6 and 7 there is illustrated the electronics in box 22 necessary for processing light signals emitted from optical fibers 40 and 40'. A separate circuit is provided for each optical output. Upon arriving at a detector, the optical signal is converted into an electrical signal by photodiode 50 and amplified. The photodiode is operated in the short circuit mode. Following the photodiode sensor amplifier 50 is a gain amplifier 52 and a low pass filter 54 to remove any high frequency noise and signal variations. Following the filter is a comparator 56 which compares the signal level to a threshold level. When the threshold level is exceeded by detecting a high reflectivity, the output of the comparator will go high. For low reflectivity, a low output of the comparator will occur. The detector signal is driven through a line driver 58 to an external recorder. Displacement of piston 16 by plate 22 is calculated by the formula:

Displacement = ND where N is the number of pulses and D is the separation between rings (band 28 spacing). See FIG. 8 which is a representation of the output to the recorder from the fibers. Velocity is calculated by the formula:

$$\text{Velocity} = (1/T)/\ (D \times (1/SC) \times (PS/RS))$$

where

SC = stripchart speed
RS = record speed
PS = playback speed
T = threads per inch Acceleration can be found by taking the derivative of the velocity. Thus, two channels of data are generated. By analysis of the two channels, displacement, velocity and acceleration can be calculated.

Having thus disclosed an embodiment of the invention it will be apparent to ones skilled in the art how to practice the invention. It will also be apparent that changes and variations can be made thereto without departing from the spirit of the invention which is defined within the scope of the claims appended hereto.

What is claimed is:

1. Apparatus for measuring direction, extent, and rate of linear displacement of a body subjected to shock forces, comprising:

a housing adapted to be connected to a rigid structure;

piston means received in the housing and adapted for linear displacement therein;

said piston means including a portion outside the housing connectable with the body whereby shock forces on the body causes the piston to be linearly displaced in the housing;

said piston means having a surface including a plurality of bands having alternating high and low light reflectivity;

means carried by the housing for illuminating linearly spaced apart spots on the piston surface including the bands;

means detecting information from band reflected light; and, means converting light information to electrical signals;

whereby, when the piston is displaced, the bands are caused to translate past the illumination for reflecting light information.

2. The invention according to claim 1 wherein the illuminating means includes a pair of optical fibers having ends terminating adjacent the bands for optical communication therewith.

3. The invention according to claim 2 wherein the optical fiber ends are linearly spaced apart.

4. The invention according to claim 3 wherein the linear spacing of the optical fiber ends is a distance which is not a multiple of the distance between corresponding locations on successive bands of like reflectivity.

5. The invention according to claim 1 wherein the bands are annularly disposed about the piston.

6. The invention according to claim 1 wherein the bands are defined by a series of linearly spaced-apart annular grooves and lands therebetween.

7. The invention according to claim 5 wherein the bands are formed by spaced apart grooves formed in the piston surface.

8. The invention according to claim 7 wherein the grooves have lower light reflectivity than lands between the grooves.

9. The invention according to claim 1 wherein the optical fiber ends emit an illuminating spot on the piston surface of a size substantially smaller than the width of any band.

10. Apparatus for measuring direction, extent and rate of linear displacement of a body subjected to an underwater shock by an explosion, comprising:

a housing;

piston means carried by the housing and having a portion extending therefrom;

said housing adapted to be secured in a fixed position;

said piston extension connectable to the body for linear displacement therewith whenever the body is subjected to the explosive shock;

said piston having a surface including a plurality of annular bands of alternating high and low light reflectivity;

light sources;

a pair of optical fibers in communication with the light sources and terminating in linearly spaced apart ends for illuminating spots on the piston surface whereby emitted light is reflected by the bands back into respective optical fibers and carried to respective detectors; and, means converting optical information received by the detectors to electrical signals;

whereby displacement of the piston is indicated by light reflecting from the bands as they translate past the optical fibers illuminating spots.

11. The invention according to claim 10 wherein the piston bands are annularly disposed about the piston;

12. The invention according to claim 11 wherein the bands are of equal linear width.

13. The invention according to claim 12 wherein the bands are formed by annular grooves with annular land therebetween.

14. The invention according to claim 13 wherein the lands are more optically reflective than the grooves.

15. The invention according to claim 12 wherein the optical fiber ends are linearly spaced apart a distance which is not a multiple of the distance between corresponding locations on successive bands of high reflectivity.

* * * * *